United States Patent [19]

Zupancic et al.

[11] Patent Number: 4,661,254

[45] Date of Patent: Apr. 28, 1987

[54] CHLORINE-RESISTANT SEMIPERMEABLE MEMBRANES

[75] Inventors: Joseph J. Zupancic, Bensenville; Raymond J. Swedo, Mount Prospect, both of Ill.

[73] Assignee: UOP Inc., Des Plaines, Ill.

[21] Appl. No.: 737,376

[22] Filed: May 23, 1985

[51] Int. Cl.$^4$ .............................................. B01D 13/00
[52] U.S. Cl. ............................... 210/490; 210/500.38; 210/500.39
[58] Field of Search ............ 210/654, 490, 491, 500.2, 210/500.38, 500.39; 427/243, 244, 245

[56] References Cited

U.S. PATENT DOCUMENTS

| | | | |
|---|---|---|---|
| 3,567,632 | 3/1971 | Richter et al. | 210/23 |
| 3,600,350 | 8/1971 | Kwolek | 260/32.6 |
| 3,710,945 | 1/1973 | Dismore | 210/321 |
| 3,878,109 | 4/1975 | Ikeda et al. | 210/500 M |
| 3,904,519 | 9/1975 | McKinney, Jr. et al. | 210/23 |
| 3,920,612 | 11/1975 | Stephens | 260/47 CP |
| 3,951,815 | 4/1976 | Wrasidlo | 210/500 M |
| 3,993,625 | 11/1976 | Kurihara et al. | 260/47 CP |
| 4,048,144 | 9/1977 | Stephens | 260/47 CP |
| 4,277,344 | 7/1981 | Cadotte | 210/654 |
| 4,302,336 | 11/1981 | Kawaguchi et al. | 210/654 |

*Primary Examiner*—Frank Spear
*Attorney, Agent, or Firm*—Thomas K. McBride; John F. Spears, Jr.; Raymond H. Nelson

[57] ABSTRACT

Chlorine-resistant semipermeable membranes which comprise an interfacial polymerization reaction product composited on a porous backing support material may be prepared by contacting a porous support material such as polysulfone with an aqueous solution of triaryl triamine. The coated support material is then contacted with an organic solvent solution of an aromatic polycarboxylic acid chloride for a period of time sufficient to form an interfacial polymerized reaction product on the surface of the support material. The resultant membrane composite may be used in separation processes such as desalination of brackish or sea water, the membrane resistant to attack by chlorine which is present in the water.

25 Claims, No Drawings

CHLORINE-RESISTANT SEMIPERMEABLE MEMBRANES

BACKGROUND OF THE INVENTION

The separation of various components found in liquids or gases may be effected in a multitude of processes, the techniques for effecting the separation including ultrafiltration or reverse osmosis. A particular example of the latter type of separation involves a desalination process in which water which is rendered potable or suitable for other purposes is obtained from sea water, contaminated water, brackish water or brine. This process is of especial value in areas of the world where the water found in the area is brackish or is saline in nature. The desalination of this water is necessary in order to provide large amounts of potable or relatively nonsalty water for industrial, agricultural or home use. The desalination of the water is effected by forcing the water through a reverse osmosis membrane whereby the purified water is passed through the membrane and recovered, while the contaminants or salts do not pass through the membrane, thus, in effect, being rejected by the membrane and recovered as the retentate.

A reverse osmosis membrane, in order to be utilized for such a purpose, must possess certain characteristics applicable to the process. For example, the membrane must have a very high salt rejection coefficient. In addition, another important characteristic and a problem which must be addressed when utilizing the membrane, is the ability of the membrane to be resistant to chlorine attack. Another important factor which is present in the use of a reverse osmosis membrane is that said membrane also possess a high flux characteristic, that is, the ability to pass a relatively large amount of water through the membrane at relatively low pressures. If a membrane possesses these desirable characteristics, it will be commercially feasible in its applicability to the desalination process.

Reverse osmosis membranes have been prepared and used from a wide variety of known polymeric materials. While many of these polymeric materials possess the ability of reducing the concentration of a solute to where the salt rejection capability is in excess of 98%, some do not possess the necessary flux rate whereby the volume of water which is required to be produced by the membrane per unit of membrane surface is sufficient for the applications of the technology.

As was hereinbefore set forth, many prior U.S. patents describe various membranes which are useful in desalination processes. For example, U.S. Pat. Nos. 3,567,632, 3,600,350, 3,710,945, 3,878,109, 3,904,519, 3,920,612, 3,951,815, 3,993,625 and 4,048,144 illustrate various semipermeable membranes prepared from polyamides. Likewise, U.S. Pat. Nos. 3,260,691 and 3,480,588 disclose coating compositions which are obtained from the condensation products of aromatic primary diamines and aromatic tricarboxylic compounds.

Inasmuch as the semipermeable membrane which is used for the desalination process should be relatively thin in nature in order to provide a desirable flux rate, it is necessary, in many instances, that the reverse osmosis membrane be composited or laminated on a porous backing support material. This porous support backing material should in itself possess certain characteristics which make it desirable for such a use. For example, the porous support material should possess pore sizes which are sufficiently large enough so that the water or permeate can pass through the support without affecting or lessening the flux rate of the entire composite. Conversely speaking, the pore size should not be large enough so that the thin composite semipermeable membrane will tend to fill up or enter into the pores, thus distorting the shape of the thin film membrane with the attendant possibility of rupturing the membrane, thus causing said membrane to lose its effectiveness in the reverse osmosis process.

In addition to the aforementioned U.S. patents, another U.S. Pat. No. 4,277,344, discloses an interfacial synthesized reverse osmosis membrane. This membrane is prepared from a cross-linked interfacially polymerized aromatic polyamine which has been prepared from an essentially monomeric polyacyl halide and an essentially monomeric arylene polyamine.

As will be shown in the following specification and examples, we have now discovered that semipermeable membranes which possess the desirable characteristics of high salt rejection, good flux and high resistance to chlorine may be prepared in an interfacial polymerization reaction involving a triaryl triamine and an aromatic polycarboxylic acid chloride, the resulting reaction product being composited on a porous support.

SUMMARY OF THE INVENTION

This invention relates to reverse osmosis membranes. More specifically, the invention is concerned with reverse osmosis membranes which exhibit an extreme resistance to chlorine degradation.

As was previously discussed, the use of reverse osmosis membranes for the separation of liquid from liquid or solids from liquids are important articles of commerce. This is especially true in the area of desalination whereby water which is brackish or saline in nature may be rendered potable or suitable for use in other industrial or agricultural regions by passing the water through reverse osmosis membranes. The particular membranes which constitute the inventive feature of the present application will comprise the reaction product resulting from the reaction of an aromatic polyamine and an aromatic polycarboxylic acid chloride, said membrane being composited or coated on a porous support backing material. By utilizing these membranes in a desalination process, it is possible to treat a saline or brackish water source over a relatively long period of time without replacement of the membrane, the long life of the membrane being, in part, due to the resistance to degradation resulting from exposure to chlorine in the water source.

It is therefore an object of this invention to provide a reverse osmosis membrane, suitable for use in separation processes, which possesses desirable characteristics.

A further object of this invention is to provide a process for preparing a semipermeable membrane which is resistant to chlorine, thus rendering the membrane suitable for use in separation processes such as desalination of water where chlorine is present in an amount sufficient to degrade other types of membranes.

In one aspect an embodiment of this invention resides in a chlorine-resistant semipermeable membrane comprising a porous support backing material having supported thereon an interfacial polymerized condensation reaction product resulting from the reaction of a triaryl triamine and an aromatic polycarboxylic acid chloride.

Another embodiment of this invention resides in a process for the preparation of a chlorine-resistant semipermeable membrane which comprises casting a solution of a triaryl triamine on a porous support backing material, removing excess solution, contacting said coated support material with an organic solvent solution of an aromatic polycarboxylic acid chloride to form an interfacial condensation reaction product membrane on the surface of said porous support backing material, removing excess solution, curing the resultant composite at curing conditions, and removing the resultant chlorine-resistant semipermeable membrane.

A specific embodiment of this invention is found in a chlorine-resistant semipermeable membrane comprising polysulfone having supported thereon the interfacial polymerized condensation reaction product resulting from the reaction of 2,4-bis(p-aminobenzyl) aniline and trimesoyl chloride.

Another specific embodiment of this invention resides in a process for the preparation of a chlorine-resistant semipermeable membrane which comprises casting an aqueous solution of 2,4-bis(p-aminobenzyl) aniline on a porous support backing material comprising polysulfone, removing excess solution, contacting said coated polysulfone with a hexane solution of trimesoyl chloride to form an interfacial polymerized condensation reaction product membrane on the surface of said polysulfone, removing excess solution, curing the resultant composite at a temperature in the range of from about 25° to about 150° C. for a period of time in the range of from about 1 minute to about 2 hours, and recovering the resultant chlorine-resistant semipermeable membrane.

Other objects and embodiments may be found in the following detailed description of the invention.

DETAILED DESCRIPTION OF THE INVENTION

As hereinbefore set forth, the present invention is concerned with semipermeable membranes which are resistant to chlorine. The membranes are prepared by casting an aqueous solution of a triaryl triamine on a porous backing support material, removing excess solution, and thereafter contacting the coated support material with an organic solvent solution of an aromatic polycarboxylic acid chloride, said organic solvent being immiscible with the aqueous solution, whereby an interfacial polymerized condensation reaction product is formed on the surface of the support material. The resulting composite is then cured to provide a semipermeable membrane which exhibits favorable characteristics with respect to salt rejection as well as resistance to chlorine.

The triaryl triamines which comprise one component of the product of the present invention will be selected from the group consisting of 2,3-bis(p-aminobenzyl) aniline, 2,4-bis(p-aminobenzyl) aniline, 2,5-bis-(p-aminobenzyl) aniline, 2,6-bis(p-aminobenzyl) aniline, 2,3-bis-(o-aminobenzyl) aniline, 2,4-bis(o-aminobenzyl) aniline, 2,5-bis(o-aminobenzyl) aniline, 2,6-bis(o-aminobenzyl) aniline, 2,3-bis(m-aminobenzyl) aniline, 2,4-bis(m-aminobenzyl) aniline, 2,5-bis(m-aminobenzyl) aniline, and 2,6-bis(m-aminobenzyl) aniline. The aromatic polycarboxylic acid chloride which forms the other component necessary to form the interfacial polymerized condensation reaction product will comprise either a di- or tricarboxylic acid chloride such as trimesoyl chloride, 1,3,5-benzene tricarboxylic acid chloride, isophthaloyl chloride, terephthaloyl chloride, pyridine dicarboxylic acid chlorides as well as mixtures thereof.

In one embodiment, the chlorine-resistant semipermeable membranes of the present invention may be prepared by coating the porous support backing material with an aqueous solution of the triaryl triamine. As was previously set forth, the porous support backing material comprises a polymeric material containing pore sizes which are sufficient to permit the passage of permeate therethrough but are not large enough so as to interfere with the bridging over of the resulting ultra-thin reverse osmosis membrane. In the preferred embodiment of the invention, the pore sizes of the porous support backing material will range from about 1 to about 1000 millimicrons inasmuch as pores which are larger than 1000 millimicrons will permit the ultra-thin reverse osmosis membrane to sag into the pore, thus disrupting the flat sheet configuration which is a desirable characteristic of the membrane. Examples of porous support backing material which may be used to prepare the desired membrane composite will include such polymers as polysulfone, polycarbonate, microporous polypropylene, the various polyamides, polyphenol ether, etc.

The porous support backing material is coated with an aqueous solution of the triaryl triamine utilizing either a hand casting or continuous operation. The solution which is utilized as the carrier for the triaryl triamine will be 100% water or 100% acetonitrile or intermediate mixtures of water and acetonitrile. In the preferred embodiment of the invention, the triaryl triamine will be present in the solution in an amount in the range of from about 0.1 to about 5% by weight of the solution. In addition, it is also contemplated within the scope of this invention that the solution may also contain additional components which, while not entering into the reaction, provide additional assistance in formulating the desired interfacial polymerization reaction product. Examples of these additives which may be present will include surfactants including ionic surfactants such as sodium lauryl sulfate, lower molecular weight alcohols such as methanol, ethanol, the isomeric propanols, butanols, or nonionic surfactants such as polyethylene glycol, polypropylene glycol, copolymers of ethylene glycol and propylene glycol, etc. In addition, the aqueous solution may also contain basic acid scavengers such as sodium hydroxide, potassium hydroxide, sodium carbonate, potassium carbonate, etc.

After coating the porous support backing material with the solution of the triaryl triamine, the excess solution is drained and the coated support material is then contacted with an organic solvent solution of the aromatic polycarboxylic acid chlorides. Again, in the preferred embodiment of the invention, the aromatic polycarboxylic acid chlorides are present in the organic solvent solution in a range of from about 0.1 to about 5% by weight of the solution. The organic solvents which are employed in the process of this invention will comprise paraffins such as n-pentane, n-hexane, n-heptane, cyclopentane, cyclohexane, methylcyclopentane, etc. or, a halogenated solvent such as trichlorotrifluoroethane. Preferably, the triaryl triamine and the aromatic polycarboxylic acid chloride are present in the reaction product in a weight ratio of from about 0.1:1 to about 40:1, respectively.

Inasmuch as the organic solvent and the solvent for the triaryl triamine are substantially immiscible or incompatible, the polymerization of the two components of the membrane will occur substantially only at the interface between the solvent phases and thus an interfacially polymerized reaction product comprising a thin film membrane will be formed thereat. The contact time required for the formation of the thin film membrane will fluctuate over a relatively wide range of from about 1 second to about 60 seconds. Following the formation of the interfacially polymerized reaction product on the surface of the porous support backing material, the resultant composite may be cured to remove any remaining solvent and firmly affix the thin film membrane on the surface of the support. The curing of the composite membrane may be effected over a wide temperature range, said temperature being from ambient (20°–25° C.) up to about 150° C. for a period of time ranging from about 1 minute to about 2 hours or more in duration. The operating parameters of time and temperature will be interdependent, the primary criteria for the curing of the membrane being that said curing time is sufficient to provide the desired membrane but being insufficient to affect the desired characteristics of the thin film membrane and the porous backing support material. For example, excessive heat or curing time may affect the pore size of the backing material, thus resulting in a decrease of the desired flux rate of the membrane.

It is also contemplated within the scope of this invention that the chlorine-resistant semipermeable membrane may be prepared in a continuous manner of operation. When this type of operation is employed, a porous support backing material of the type hereinbefore set forth in greater detail is continuously passed through a bath of a solution of the triaryl triamine, said solution also containing, if so desired, a surfactant and an acid scavenger. After passage through the bath, the backing material is continuously withdrawn and, if so desired, passed between rollers in order to remove any excess solution which may be present. The coated support material is then also continuously passed through the solution of the aromatic polycarboxylic acid chloride in an organic solvent. The interfacial polymerization reaction will occur during the contact time between the solutions following which the composite comprising the interfacial polymerized reaction product in the form of a thin film semipermeable membrane on the porous support backing material will then be cured as, for example, by passage through an oven which is maintained at a desired curing temperature, the passage through said oven being at a predetermined rate so as to avoid any possible damage to the composite membrane.

The resultant chlorine-resistant semipermeable membrane may then be employed for the separation process desired such as the desalination of sea water or brackish water, other treatments of water such as softening of hard water whereby salts are removed, boiling said water treatment, concentration of whey, etc. The membranes which are in the form of flat sheets are particularly applicable for use in modules either in single sheet or multiple sheet units whereby the sheet or sheets are wound in a spiral type configuration.

The following examples are given for purposes of illustrating the novel chlorine-resistant semipermeable membranes and to their use thereof as separation agents. However, it is to be understood that these examples are provided merely for purposes of illustration and that the present invention is not necessarily limited thereto.

EXAMPLE I

A chlorine-resistant semipermeable membrane was prepared by handcasting a solution comprising 1.0% by weight of 2,4-bis(p-aminobenzyl) aniline in a solvent comprising 97% of a 50/50 mixture of acetonitrile and water and 3% isopropanol on a 8"×10" sheet of polysulfone at ambient temperature and pressure. The excess solution was drained after a period of 30 seconds and the coated polysulfone was contacted with a solution of trimesoyl chloride in a hexane solution. After a period of 30 seconds, the excess organic solvent was drained and the resulting semipermeable membrane composite was washed with water at a temperature of 21° C. for a period of 15 minutes. The membrane composite was then cured at a temperature of 70° C. for a period of 30 minutes.

A sample of the membrane prepared according to the above paragraph in a size of 1"×3" was placed in a cell and a synthetic sea water feed containing 5000 ppm of sodium chloride was passed across the surface of the membrane at a feed flow rate of 1.3 gal. per min. (GPM). The test conditions which were employed during the experiment included a pressure of 800 pounds per square inch (psi) on one side of the membrane while the other side of the membrane was maintained at atmospheric pressure. A temperature of 25° C. was maintained throughout the experiment while keeping the pH of the feed at 5.5. The permeate which was collected from the flowthrough was measured and it was found that there was a 62% rejection of sodium chloride and a flux rate of 5 GFD.

EXAMPLE II

In a manner similar to that set forth in Example I above, another membrane was prepared by contacting an 8"×10" sheet of polysulfone with a solution comprising 1.0% by weight of 2,4-bis(p-aminobenzyl) aniline in a solvent comprising 50% acetonitrile and 50% water at ambient temperature and pressure for a period of 30 seconds. The excess solution was drained and the coated polysulfone support was contacted with an organic solution comprising 1.0% by weight of trimesoyl chloride in hexane. After allowing a contact period of 30 seconds, the excess solution was drained, washed with water and cured at a temperature of 70° C. for a period of 30 minutes.

As in the previous example, a 1"×3" sample of the membrane prepared according to the above paragraph was placed in a cell and subjected to a feed similar in nature to that set forth in Example I above. The operating conditions under which this experiment was performed were similar in nature to those set forth above. Analysis of the permeate recovered from this experiment disclosed that there had been a 91.9% rejection of sodium chloride at a flux rate of 4.6 GFD.

Similar experiments utilizing membranes prepared in a like manner showed rejection rates ranging from about 62% up to the 90% flux rates ranging from 2 to about 14 GFD.

EXAMPLE III

In a manner similar to that set forth in Example I above, another membrane was prepared by contacting an 8"×10" sheet of polysulfone with a solution comprising 1.0% by weight of 2,4-bis(p-aminobenzyl) aniline in a solution comprising 50% acetonitrile and 50% water, and adjusted to a pH of 9.0 with sodium hydroxide, at ambient temperature and pressure for a period of 30 seconds. The excess solution was drained and the coated polysulfone support was contacted with an organic solution comprising 1.0% by weight of trimesoyl chloride in hexane. After allowing a contact period of 30 seconds, the excess solution was drained, and the membrane was cured at a temperature of 70° C. for a period of 30 minutes.

As in previous examples, a 1"×3" sample of the membrane prepared according to the above paragraph was placed in a cell and subjected to a feed similar in nature to that set forth in Example I above. The operating conditions under which this experiment was performed were similar in nature to those set forth above. Analysis of the permeate recovered from this experiment disclosed that there had been a 64% rejection of sodium chloride at a flux rate of 3.6 GFD.

EXAMPLE IV

Another membrane was prepared in a manner similar to that set forth in Example III above by interfacially polymerizing a solution containing 1.0% by weight of 2,4-bis(p-aminobenzyl) aniline dissolved in a 50/50% solution of acetonitrile and water, adjusted to a pH of 9.0 with sodium hydroxide, and a solution comprising 0.85% by weight of trimesoyl chloride and 0.15% by weight of isophthaloyl chloride dissolved in hexane, said interfacial polymerized condensation reaction product being composited on a polysulfone support. The resulting membrane was utilized to effect a sodium chloride separation from a synthetic sea water feed containing 5000 ppm of sodium chloride. After one hour of treatment at reaction conditions, which included a pressure of 800 psi, a temperature of 25° C., a pH of 5.5, and a feed rate of 1.3 GPM, analysis of the permeate showed a 75% rejection of sodium chloride at a flux rate of 1.8 GFD.

EXAMPLE V

In this example, a membrane was prepared using a continuous casting technique. The process was effected by continuously passing a sheet of polysulfone through a bath of 2.0% by weight of 2,4-bis(p-aminobenzyl) aniline in a 50/50% solution of acetonitrile and water which contained 0.025% by weight of a surfactant comprising sodium lauryl sulfate. The rate of passage of the polysulfone through the bath was effected at a speed of 0.33 ft. per min. at atmospheric pressure and ambient temperature. The contact of the polysulfone sheet with the water in acetonitrile lasted for a period of 20 seconds. The sheet of coated polysulfone was continuously withdrawn and the excess solution was drained therefrom. Following this, the sheet was continuously passed through a bath of hexane which contained 0.15% by weight of isophthaloyl chloride and 0.85% trimesoyl chloride. Again, the contact of the coated polysulfone sheet with the organic solution lasted for a period of 20 seconds. Thereafter, the thin film semipermeable membrane composite on the surface of the polysulfone was recovered and subjected to a curing step in an oven at a temperature of 70° C. for a period of 30 minutes.

A 1"×3" sample of the membrane prepared according to the above paragraph was placed in a cell and a feedstock consisting of a synthetic sea water feed which contained 5000 ppm of sodium chloride feed was passed over the surface of the membrane at a temperature of 25° C. and a pressure of 800 psi on one side of the membrane, the other side of the membrane being maintained at atmospheric pressure. The feed was passed over the membrane at a rate of 1.3 GPM while maintaining the pH at 5.5. After one hour, analysis of the permeate showed that there had been a 21% rejection of the sodium chloride at a flux rate of 17.3 GFD. Following this, sodium hypochlorite was added to the feed in an amount so as to provide 4 ppm of chlorine to the feed. Analysis of the permeate after a period of two hours under identical operating conditions showed a 92% rejection of the sodium chloride at a flux rate of 19.0 GFD.

Samples of the membrane which were prepared according to the first paragraph of this example were then soaked in a solution of sodium hypochlorite which contained 8 ppm chlorine for a period of 11 days. The membranes were then placed in a cell and subjected to a salt separation under similar operating conditions to those previously set forth in this example. Analysis of the permeate resulting from the sodium chloride feed, after a period of two hours, showed a sodium chloride rejection of 29 at a flux rate of 13.3 GFD. Following this, sodium hypochlorite was added to the synthetic sea water feed so as to provide 5 ppm of chlorine in the feed. At the end of 1.5 hours of treatment, analysis of the permeate showed a 31% rejection of the sodium chloride at a flux rate of 11.4 GFD.

EXAMPLE VI

Two similar membranes were prepared by a continuous casting technique. In one case, a 50/50% solution of acetonitrile and water which contained 0.75% by weight of 2,4-bis(p-aminobenzyl) aniline, 0.020% by weight of sodium lauryl sulfate as a surfactant, and adjusted to pH 9.9 with aqueous sodium hydroxide, was used to coat a polysulfone porous support which was passed through the bath of the solution in contact for a period of 25 seconds. The thus coated polysulfone support was then passed through a hexane bath which contained 1.5% by weight of trimesoyl chloride, again for a period of 25 seconds. The interfacial polymerized membrane was then cured at a temperature of 125° C. for a period of 30 minutes.

A sample of the thus prepared membrane was tested by passing a synthetic sea water feed containing 35,000 ppm of sodium chloride through the membrane at a feed rate of 1.3 GPM while maintaining a pH of 5.5, a temperature of 25° C. and a pressure of 800 psi on one face of the membrane. Analysis of the permeate showed there had been a 95% rejection of the sodium chloride at a flux rate of 3.4 GFD. Similar membranes containing the same amount of amine and acid chloride showed rejection rates ranging from 54 to 92% with flux rates ranging from 4.1 to 11.0 GFD.

A similar membrane was prepared using an acetonitrile-water solution containing 1.0% by weight of 2,4-bis(p-aminobenzyl) aniline and 0.025% by weight of sodium lauryl sulfate as a surfactant, and a hexane solution containing 1.0% by weight of trimesoyl chloride coated on a porous sulfone support utilizing a contact time of 20 seconds for each solution. The resulting membrane when tested in a cell under similar conditions to that employed in the above paragraph and with a similar synthetic water feed showed a 95.8% rejection of sodium chloride at a flux rate of 5.6 GFD.

EXAMPLE VII

Similar chlorine-resistant semipermeable membranes may also be prepared by treating a porous support such as polycarbonate, polyphenyl ether or polyamide with a solution of 2,6-bis(p-aminobenzyl) aniline, 2,3-bis(m-aminobenzyl) aniline, or 2,5-bis(o-aminobenzyl) aniline in an aqueous solution or a solution of acetonitrile and water which may contain a surfactant and thereafter subjecting the coated support to contact with an organic solution of isophthaloyl chloride, terephthaloyl chloride, trimesoyl chloride, pyridine dicarboxylic acid chloride or mixtures thereof to form an interfacial polymerized condensation reaction product on the surface of the support. The resulting membrane may then be used in various separation processes such as the desalinization of sea water.

We claim as our invention:

1. A chlorine-resistant semipermeable membrane comprising a porous support backing material having supported thereon an interfacial polymerized condensation reaction product resulting from the reaction of (1) a triaryl triamine selected from the group consisting of 2,3-bis(p-aminobenzyl) aniline, 2,4-bis(p-aminobenzyl) aniline, 2,5-bis(p-aminobenzyl) aniline, 2,6-bis(p-aminobenzyl) aniline, 2,3-bis(o-aminobenzyl) aniline, 2,4-bis(o-aminobenzyl) aniline, 2,5-bis(o-aminobenzyl) aniline, 2,6-bis(o-aminobenzyl) aniline, 2,3-bis(m-aminobenzyl) aniline, 2,4-bis(m-aminobenzyl) aniline, 2,5-bis(m-aminobenzyl) aniline, and 2,6-bis(m-aminobenzyl) aniline and (2) an aromatic polycarboxylic acid chloride.

2. The chlorine-resistant semipermeable membrane as set forth in claim 1 in which said aromatic polycarboxylic acid chloride is selected from the group consisting of isophthaloyl chloride, terephthaloyl chloride, trimesoyl chloride, and pyridine dicarboxylic acid chloride.

3. The chlorine-resistant semipermeable membrane as set forth in claim 1 in which said triaryl triamine is present in said interfacial polymerized condensation reaction product in a weight ratio in the range of from about 0.1:1 to about 40:1 of triaryl triamine to aromatic polycarboxylic acid chloride.

4. The chlorine-resistant semipermeable membrane as set forth in claim 1 in which said porous support backing material comprises polysulfone.

5. The chlorine-resistant semipermeable membrane as set forth in claim 1 in which said porous support backing material comprises polycarbonate.

6. The chlorine-resistant semipermeable membrane as set forth in claim 1 in which said porous support backing material comprises polyphenyl ether.

7. The chlorine-resistant semipermeable membrane as set forth in claim 1 in which said porous support backing material comprises polyamide.

8. The chlorine-resistant semipermeable membrane as set forth in claim 1 in which said triaryl triamine comprises 2,4-bis(p-aminobenzyl) aniline and said aromatic polycarboxylic acid chloride comprises trimesoyl chloride.

9. The chlorine-resistant semipermeable membrane as set forth in claim 1 in which said triaryl triamine comprises 2,6-bis(p-aminobenzyl) aniline and said aromatic polycarboxylic acid chloride comprises trimesoyl chloride.

10. The chlorine-resistant semipermeable membrane as set forth in claim 1 in which said triaryl triamine comprises 2,3-bis(m-aminobenzyl) aniline and said aromatic polycarboxylic acid chloride comprises isophthaloyl chloride.

11. The chlorine-resistant semipermeable membrane as set forth in claim 1 in which said triaryl triamine comprises 2,5-bis(o-aminobenzyl) aniline and said aromatic polycarboxylic acid chloride comprises terephthaloyl chloride.

12. The chlorine-resistant semipermeable membrane as set forth in claim 1 in which said triaryl triamine comprises 2,4-bis(p-aminobenzyl) aniline and said aromatic polycarboxylic acid chloride comprises a mixture of trimesoyl chloride and isophthaloyl chloride.

13. A process for the preparation of a chlorine-resistant semipermeable membrane which comprises casting a solution of a triaryl triamine on a porous support backing material, removing excess solution, contacting said coated support material with an organic solvent solution of an aromatic polycarboxylic acid chloride to form an interfacial condensation reaction product membrane on the surface of said porous support backing material, removing excess solution, curing the resultant composite at curing conditions, and removing the resultant chlorine-resistant semipermeable membrane, said triaryl triamine being selected from the group consisting of 2,3-bis(p-aminobenzyl) aniline, 2,4-bis(p-aminobenzyl) aniline, 2,5-bis(p-aminobenzyl) aniline, 2,6-bis(p-aminobenzyl) aniline, 2,3-bis(o-aminobenzyl) aniline, 2,4-bis(o-aminobenzyl) aniline, 2,5-bis(o-aminobenzyl) aniline, 2,6-bis(o-aminobenzyl) aniline, 2,3-bis(m-aminobenzyl) aniline, 2,4-bis(m-aminobenzyl) aniline, 2,5-bis(m-aminobenzyl) aniline, and 2,6-bis(m-aminobenzyl) aniline.

14. The process as set forth in claim 13 in which said curing conditions include a temperature in the range of from about 25° to about 150° C. for a period of time in the range of from about 1 minute to about 2 hours.

15. The process as set forth in claim 13 in which said solution of said triaryl triamine is an aqueous solution which may include an ionic or a nonionic surfactant.

16. The process as set forth in claim 13 in which said solution of triaryl triamine is an aqueous solution which may include an organic solvent which is miscible with water.

17. The process as set forth in claim 13 in which said porous support backing material comprises polysulfone.

18. The process as set forth in claim 13 in which said porous support backing material comprises polycarbonate.

19. The process as set forth in claim 13 in which said porous support backing material comprises polyphenyl ether.

20. The process as set forth in claim 13 in which said porous support backing material comprises polyamide.

21. The process as set forth in claim 13 in which said triaryl triamine comprises 2,4-bis(p-aminobenzyl) aniline and said aromatic polycarboxylic acid chloride comprises trimesoyl chloride.

22. The process as set forth in claim 13 in which said triaryl triamine comprises 2,6-bis(p-aminobenzyl) aniline and said aromatic polycarboxylic acid chloride comprises trimesoyl chloride.

23. The process as set forth in claim 13 in which said triaryl triamine comprises 2,3-bis(m-aminobenzyl) aniline and said aromatic polycarboxylic acid chloride comprises isophthaloyl chloride.

24. The process as set forth in claim 13 in which said triaryl triamine comprises 2,5-bis(o-aminobenzyl) aniline and said aromatic polycarboxylic acid chloride comprises terephthaloyl chloride.

25. The process as set forth in claim 13 in which said triaryl triamine comprises 2,4-bis(p-aminobenzyl) aniline and said aromatic polycarboxylic acid chloride comprises a mixture of trimesoyl chloride and isophthaloyl chloride.

* * * * *